United States Patent [19]

Bergkvist

[11] 4,242,000
[45] Dec. 30, 1980

[54] ARRANGEMENT AT SCREENS INTENDED TO GIVE RISE TO A MOIRE PATTERN

[76] Inventor: Lars A. Bergkvist, Gottne, 890 42 Mellansel, Sweden

[21] Appl. No.: 937,785

[22] Filed: Aug. 29, 1978

[30] Foreign Application Priority Data

Sep. 9, 1977 [SE] Sweden .................... 7710139

[51] Int. Cl.³ .............. G01B 11/14; G01B 11/00; G01B 9/02; G02B 5/18
[52] U.S. Cl. .................... 356/374; 356/363; 356/354; 350/162 R
[58] Field of Search .............. 356/363, 354, 355, 356, 356/395, 401, 374; 350/162 R; 250/237 G

[56] References Cited

U.S. PATENT DOCUMENTS

| | | | |
|---|---|---|---|
| 3,162,711 | 12/1964 | Pegis | 356/395 |
| 3,217,590 | 11/1965 | Lawrence | 356/395 X |
| 3,604,813 | 9/1971 | Tekrounie et al. | 356/401 |

Primary Examiner—John K. Corbin
Assistant Examiner—Rodney B. Bovernick
Attorney, Agent, or Firm—LeBlanc, Nolan, Shur & Nies

[57] ABSTRACT

An arrangement and structural cross section of grid lines in screens which present a moiré pattern. The cross-sections of the screen lines are arranged so that light from behind the screen is not reflected on the front of the grid lines and the moiré pattern, as seen by an observer at the front of the screens, better depicts the information pattern by avoiding distortion arising in prior art structures. Several embodiments of screen grid line cross-sections are proposed.

3 Claims, 10 Drawing Figures

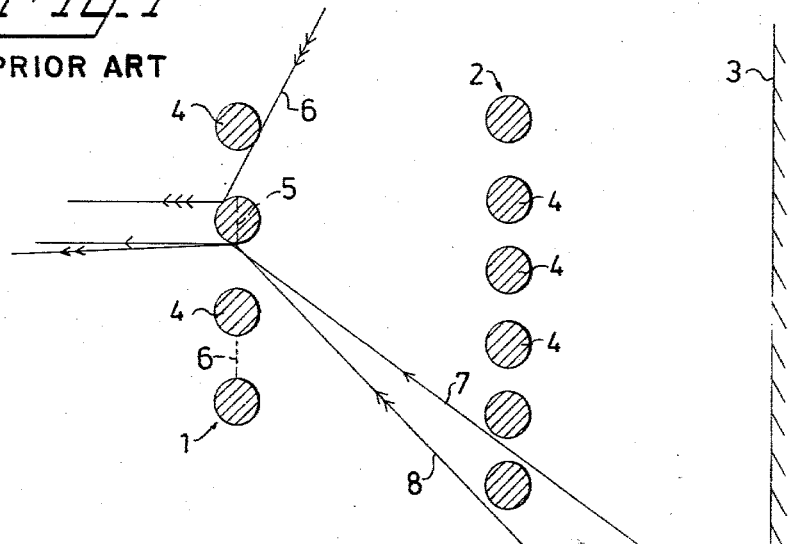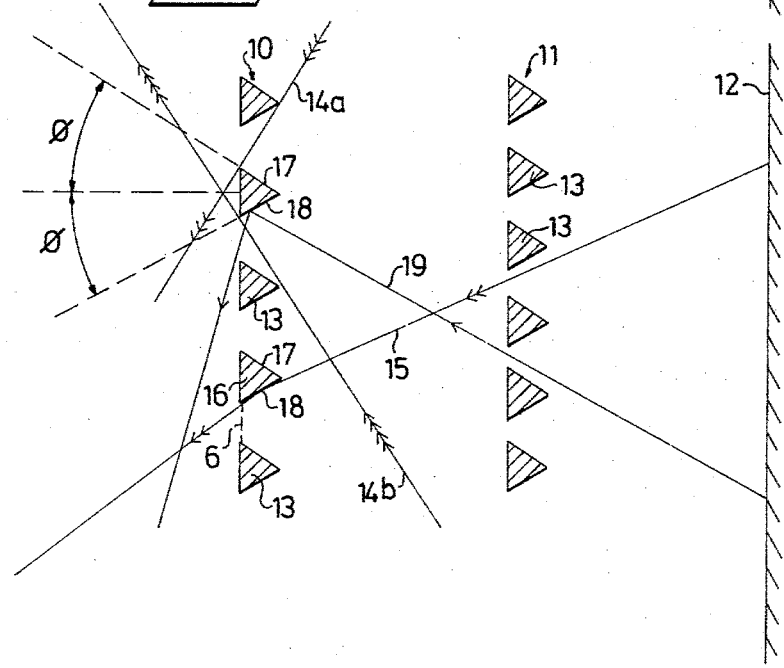

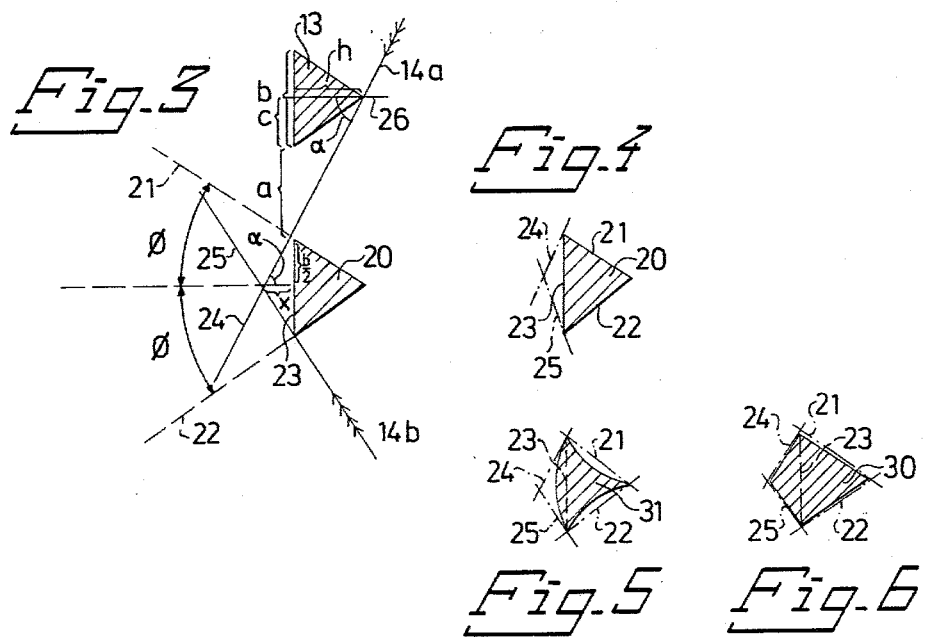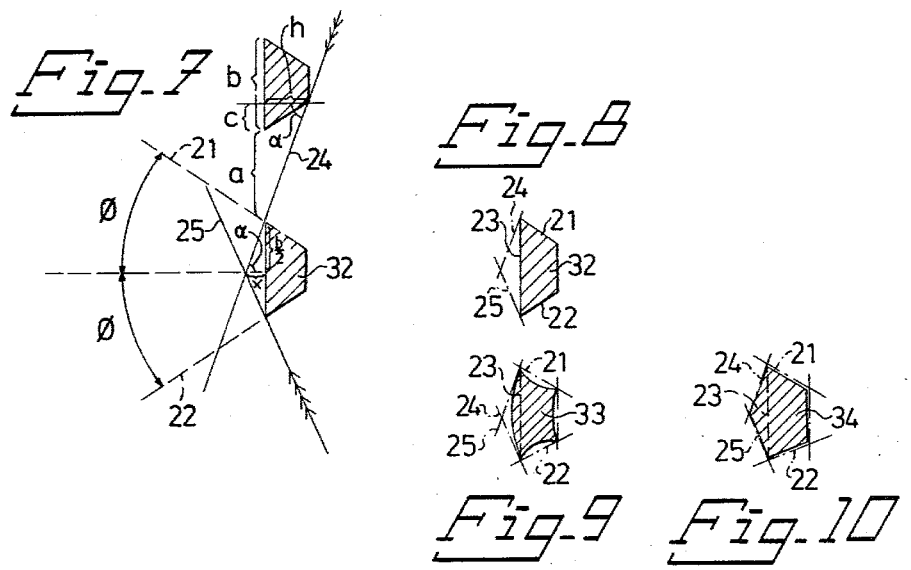

ARRANGEMENT AT SCREENS INTENDED TO GIVE RISE TO A MOIRÉ PATTERN

BACKGROUND OF THE INVENTION

This invention relates to an arrangement of screens intended to give rise to a moiré pattern, which pattern is used, for example, for the purposes stated, for example, SE-PS, (patent application No. 7611513-8). corresponding to U.S. patent application Ser. No. 841,121, now U.S. Pat. No. 4,166,699. The present invention, more definitely, relates to the design of the opaque screen lines existing at such screens and separated by transparent interspaces.

In said Se-PS (patent application No. 7611513-8) a screen arrangement is described which is intended to indicate a.o. a certain plane. Said screen arrangement consists of two or more frames and of a plurality of mutually parallel opaque screen lines attached in said frames.

When observing an arrangement according to said Swedish patent, a moiré pattern appears which contains information of on which side of a certain plane the observer is or if the observer is in said plane.

The moire pattern formed, however, is conditioned entirely on the division of the different screens, i.e. on the size relation between the opaque and transparent lines, respectively. When the division in one or several screens is changed, thus, a different moiré pattern arises.

The screen arrangement described above and in the following is to be regarded only as an example regarding the utilization of the present invention.

It was found that the moiré pattern in one and the same screen arrangement comprising at least two screens is changed at certain light conditions without a change of the divisions of the screens having taken place. As a result, the screen arrangement can produce a moiré pattern, which is unclear, distorted and in certain cases more or less incorrect relative to the pattern intended. In the lastmentioned case, thus, the intended indicating effect of the moiré pattern can be wrong. This problem is greatest at screen arrangements for outdoor use, and especially when the screen arrangements are provided with a lighted up background as stated in said patent, in order to render it possible to read the screen arrangement during the dark hours of a day.

The present invention solves the aforesaid problem.

OBJECTS OF THE INVENTION

The invention relates to an arrangement at screens intended to give rise to a moiré pattern, where each screen includes a number of opaque longitudinal objects, which are separated by transparent interspaces.

The invention is characterized in that each of the cross-sections of the longitudinal objects is formed so that light falling from behind the screens in the screen arrangement, seen from the observer, in the direction to its front side is not reflected on said longitudinal objects in such a way, that the observer is met by said reflected light when the observer is within an angle sector relative to the arrangement, within which sector the arrangement is intended to be used.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawing figures, in which:

FIG. 1 is a cross-section of a portion of a known screen arrangement,

FIG. 2 shows a portion of a screen arrangement where the present invention is applied, FIG. 3 is a detail from FIG. 2, FIGS. 4, 5, 6 show embodiments of the arrangement according to the invention, FIG. 7 corresponds to FIG. 3 showing a further embodiment of the arrangement, FIGS. 8, 9, 10 show further embodiments of the arrangement according to the invention.

In FIG. 1 a portion of a known screen arrangement is shown, for example of an arrangement according to SE-PS (patent application No. 7611513-8), where the forward screen is designated by 1, the rearward screen is designated by 2, and a light background is designated by 3. The divisions of the forward and rearward screen are so adjusted that a desired moire pattern is obtained. The width of the opaque longitudinal objects 4, or of the screen lines, is intended to be the diameter 5 of the longitudinal objects which in the example are chosen to have round cross-section. The width of the transparent interspaces is intended to be the distance 6 between the longitudinal objects 4. Provided that light from the background 3 is not reflected in front of said diameter of the longitudinal objects to the observer, said division brings about the intended moire pattern.

When in use, however, portions of the forward and rearward screens, or the entire screens 1,2 will be exposed to light, which is reflected in front of said diameter 5. This is illustrated in FIG. 1 only with respect to the forward screen 1, but the same applies also to the rearward screen 2.

Light 6, thus, is incident, for example, on a screen line 4 and is tangent to an adjacent screen line. Said beam 6 is reflected on the screen line in front of the diameter 5, see FIG. 1, and continues to run to the observer. Also light 7, 8 from other portions of the light background is reflected in front of the diameter 5 to the observer. When the screen arrangement is used in darkness and, thus, all necessary light is reflected to a lighted up background 3 or emitted from the background to the screens 1,2, this will result in that the portions of the screen lines 4 lighted up in the way described above in front of the diameter 5 appear to the observer to be substantially brighter than the portions which are not lighted up. In daylight the importance of the light from the background which is reflected in the aforesaid way is reduced, because all screen lines are lighted up by the daylight.

When light is reflected in the way described above from the background in front of said diameter 5, the effective width of the screen lines 4 will be substantially smaller than the width represented by the diameter 5. This results in that the effective division, and thereby the moiré pattern, are changed to a pattern, which does not agree with the pattern intended. This involves many disadvantages, as mentioned above.

The aforesaid problems are solved by the present invention, in that the screen lines are designed in the way described above, whereby said reflections in front of said greater width 5 of the screen lines are avoided.

FIG. 2 shows a portion of a screen arrangement, which is of the same type as that shown in FIG. 1, and to which the present invention is applied. In FIG. 2 the forward screen is designated by 10, the rearward screen by 11, and the background by 12. The longitudinal objects, or the screen lines 13, are in FIG. 2 given triangular cross-section, which is one embodiment of the invention. As appears from FIG. 2, light 14a, 14b which is tangent to the rear portion of a screen line and incident on an adjacent screen line, cannot lighten up any portion of said lastmentioned screen line in front of its greatest width, which in this case is the area 16 located farthest to the left in FIG. 2, i.e. facing toward the observer.

The angle $2\phi$ in FIG. 2 indicates the angle sector, within which the arrangement is intended to be used. Said angle $2\phi$ can be varied by designing the screen arrangement 10,11,12 differently, but usually the angle is 20°–90°. It further appears from FIG. 2, that light from other portions of the background 12 cannot lighten up the screen lines 13 in such a way as to change their effective width, provided that the observer is within the angle sector $2\phi$. The light beam 15 incident at a small angle on one 18 of the rear surfaces 17,18 of the screen lines is reflected out from said rear surface 18 at an angle beyond said angle sector. The same applies to the light beam 19, which is incident on one 18 of the rear surfaces 17,18 at a large angle.

At a screen arrangement 10,11,12 according to FIG. 2, thus, an observer who is within said angle sector will see a moire pattern, which is entirely free of interferences, irrespective of the light conditions brought about by light from the background 12.

In the following, the conditions for designing said cross-section 20 of screen lines according to the invention are stated by help of FIGS. 3 and 7. As appears from FIGS. 2 and 3, the cross-section 20 is to be formed so that the rear surfaces 17,18 of the screen lines are not visible when the arrangement is observed within the angle sector $2\phi$. Furthermore, light 14a, 14b from the background 12 shall not be reflected on the screen lines to the observer when the observer is within said angle sector $2\phi$.

Said cross-section 20, thus, shall be inside defining lines, which are constituted of two rear straight defining lines 21,22 intersecting each other, seen from the observer, behind the line 23, which is the greatest width of the cross-section in the plane of the screens 10 and, respectively, 11 perpendicular to the longitudinal direction of the longitudinal objects 13, and of two forward straight defining lines 24,25 intersecting each other, seen from the observer, in front of said line 23. The firstmentioned straight defining lines 21,22 run through the end points of said line 23 and form an acute angle with said line corresponding to 90° minus half the angle $2\phi$ constituting said angle sector. Said lastmentioned straight defining lines 24,25 also run through the end points of said line 23 and are tangent to the rear portion 26 of the cross-section 13 of the adjacent longitudinal object.

The two forward defining lines 24,25 of said cross-section 20 can be expressed mathematically by the following relation when the longitudinal objects have substantially identical cross-section.

$$x = \frac{b \cdot h}{2(a + c)}$$

where as appears from FIGS. 3 and 7
b = the length of the line 23 constituting the greatest width of the cross-section
h = the height of an adjacent cross-section in the tangential point for the respective forward defining line 24,25
a = the width of the transparent interspace
c = the distance of the adjacent cross-section from said tangential point to the point located closest to the transparent interspace, taken along said line constituting the greatest width of the cross-section
x = the height in the triangle formed by said forward lines and having as base the line constituting the greatest width of the cross-section.

It appears from the aforesaid that the cross-sectional shape can be varied within said defining lines 21,22,24,25. It is to be pointed out, however, that the cross-section always can be out to the first defining lines 21,22, see FIGS. 4 and 6, given by said angle sector $2\phi$. The forward defining lines 24,25 are determined by the way how the cross-section behind the line 23 is formed. A comparison between FIG. 4 and FIG. 8 shows that the height x in the triangle in front of the line 23 is greater in FIG. 4 than in FIG. 8, due to the fact that the cross-section behind the line 23 in FIG. 8 has the form of a trapezoid.

In FIGS. 4–10 the same designations for the different defining lines are used, though these lines, for example in FIGS. 4 and 8, intersect each other at different angles, as is apparent from the last foregoing paragraph.

In FIG. 4 a preferred cross-section 20 is shown where the cross-section is an isosceles triangle.

In FIG. 6 a cross-section 30 is shown, which substantially entirely fills the area given by the defining lines 21,22,24,25.

In FIG. 5 an example of a cross-section 31 is shown which does not entirely fill the area given by the defining lines, but which meets the above condition that light from the background must not be reflected on a screen line to the observer.

The cross-section 32 according to FIGS. 7 and 8 is also a preferred one, where the cross-section is a trapezoid, at which the greater one of the parallel sides faces to the observer, and the two angular sides coincide with the rearward defining lines.

In FIG. 9 an example of a cross-section 33 is shown, which substantially is a trapezoid, but does not entirely fill the area given by the defining lines, but which meets said condition.

The cross-section 34 according to FIG. 10 consists of a trapezoid and a triangle, and it substantially entirely fills the area given by the defining lines.

A comparison corresponding to that made between FIG. 4 and FIG. 8 can be made between FIG. 6 and FIG. 10. It clearly shows that the forward triangle according to FIG. 10 defined by the lines 23,24,25 has a height lower than that shown in FIG. 6, owing to the fact that the rear surface in FIG. 10 is a trapezoid instead of a triangle according to FIG. 6.

For reasons of completeness, it is pointed out that the defining lines 21,22,24,25 and the line 23 have the same position and measures in FIGS. 4, 5 and 6 and, respectively, in FIGS. 8, 9 and 10.

By forming the opaque longitudinal objects 13 in a screen arrangement 10,11,12 according to the present invention, the considerable advantage is obtained that light incident from behind the screens 10,11, seen from the observer, in the direction to the front side is not reflected on said longitudinal objects in such a way, that the observer is met by reflected light when the observer is within an angle sector relative to the arrangement, within which sector the arrangement is intended to be used.

The forms stated in the examples have been stated primarily in order to render the invention easily understandable, even if certain forms are preferred to other ones.

A further embodiment comprises in the present invention is to use for screen arrangements a plate of plexiglass or of another transparent plastic material, into which plate a number of parallel grooves are milled, each of which has a width corresponding to an opaque line, and where the distance between the milled grooves corresponds to the width of the desired transparent interspace. A colour, tape or the like is placed in the bottom of each groove. Said longitudinal objects here are said colour, tape etc. Due to the fact that the colour, tape etc. have a very small thickness, the thickness of the opaque line is not changed apparently due to the reflection of light incident to the screen arrangement to the rear surface thereof.

The invention must not be regarded restricted to the embodiments described above, but can be varied within the scope of the attached claims. The cross-section, for example, can be given a great number of shapes, which bring about the effects intended, and which are regarded comprised in the present invention.

I claim:

1. An arrangement of screens and screen structure intended to give rise to a moiré pattern, where at least two screens are used overlapping each other, one being a front screen and the other a rear screen, and where each screen includes a number of opaque parallel longitudinal elongate objects which are separated by transparent interspaces, characterized in that: each of the longitudinal objects has a cross-section configuration providing means whereby light, incident from behind the screens, seen from the observer, viewing their front side is not reflected on said longitudinal objects in such a way, that the observer is subject to said reflected light, when the observer is within an angle sector ($2\phi$) relative to the arrangement, within which sector the arrangement is intended to be used, where said cross-section (20) is inside defining lines (21, 22, 24, 25), which are constituted of two rear straight defining lines (21, 22) intersecting each other, seen from the observer, behind the line (23), which is the greatest width of the cross-section in the plane of the screens perpendicular to the longitudinal direction of the longitudinal objects, and of two forward straght lines (24, 25) intersecting each other, seen from the observer, in front of said line (23), where the rear respective lines (21, 22) run through the respective end points of said line of greatest width (23), forming an acute angle with said line or greatest width (23) corresponding to 90° minus half the angle ($2\phi$) constituting said angle sector ($2\phi$), and where the forward respective lines (24, 25) also run through the respective end points of said line of greatest width (23) and are tangent to the rear portion of the cross-section (20) of the respective adjacent longitudinal object.

2. An arrangement according to claim 1, characterized in that the cross-section (20) is a triangle where two legs of equal length are the rear defining lines (21,22).

3. An arrangement according to claim 1, characterized in that the cross-section is a trapezoid, of which the greater one of the parallel sides faces to the observer and the two angular sides coincide with the rear respective straight defining lines (21,22).

* * * * *